May 18, 1965     R. N. McCLEERY     3,183,793
DIFFERENTIAL FLUID PRESSURE MOTORS
Filed June 1, 1962     2 Sheets-Sheet 1

INVENTOR.
ROBERT N. McCLEERY
BY
ATTORNEY

May 18, 1965   R. N. McCLEERY   3,183,793
DIFFERENTIAL FLUID PRESSURE MOTORS
Filed June 1, 1962   2 Sheets-Sheet 2
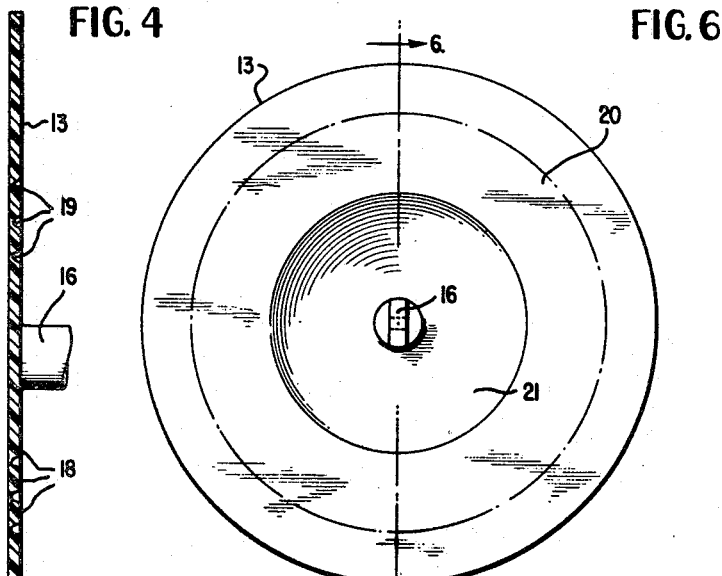
FIG. 4
FIG. 6
FIG. 5
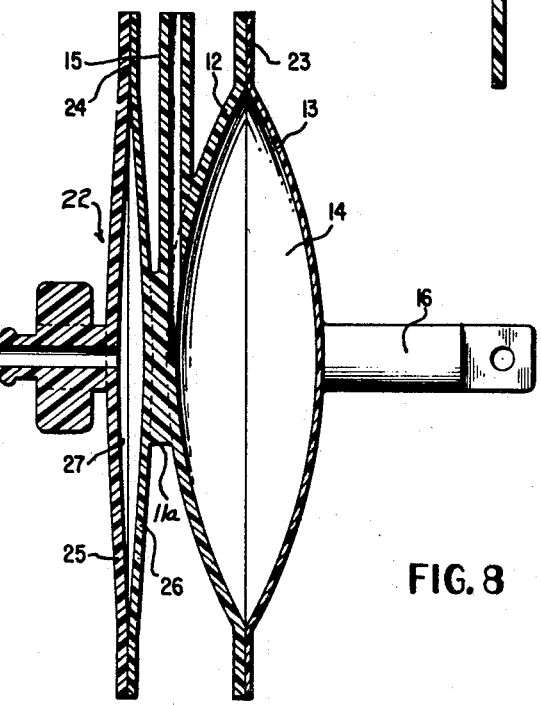
FIG. 7
FIG. 8
INVENTOR.
ROBERT N. McCLEERY
BY
ATTORNEY

United States Patent Office 3,183,793
Patented May 18, 1965

3,183,793
DIFFERENTIAL FLUID PRESSURE MOTORS
Robert N. McCleery, Detroit, Mich., assignor to The Delman Company, Cookeville, Tenn., a corporation of Tennessee
Filed June 1, 1962, Ser. No. 199,476
4 Claims. (Cl. 92—48)

This invention relates to differential fluid pressure motors generally and more particularly to an improved vacuum actuator for controlling the movement of an actuating member between a plurality of positions.

The universal adaptability of differential fluid pressure motors renders such motors suitable for a wide variety of applications wherein a simple actuating or motive mechanism is required. In the past, differential fluid pressure actuators have been effectively employed with such systems as valve systems, damper systems, wiper systems, brake systems, and many others. This widespread use has given rise to a need for the development of a simple, inexpensive, differential fluid pressure actuator which is adaptable for use as an effective motive means under a variety of conditions. In general, the differential fluid pressure actuators heretofore known in the art have been somewhat complex in nature and have employed a plurality of springs, diaphragms, and similar components. These multiple components have increased the costs involved in the production of prior actuators and have also rendered these units more susceptible to malfunction.

It is a primary object of this invention to provide an improved vacuum actuator for controlling the movement of an actuating member between a plurality of positions.

Another object of this invention is to provide an improved vacuum actuator of simple, inexpensive construction capable of operating effectively to control the movement of an actuating member between a plurality of positions.

A further object of this invention is to provide an improved vacuum actuator employing a flexible diaphragm of novel construction which is capable of operating between a plurality of positions without the use of additional spring biasing units.

Another object of this invention is to provide an improved vacuum actuator which utilizes the leverage advantage gained through the use of a flexible diaphragm to selectively move an actuating member between a plurality of positions.

A still further object of this invention is to provide an improved vacuum actuator wherein a flexible casing section, which is formed to assume a predetermined normal configuration but which flexes from this normal configuration but which flexes from this normal configuration in response to pressure differentials, cooperates with a rigid casing section to define the actuator casing.

With the foregoing and other objects in view, the invention resides in the following specification and appended claims, certain embodiments and details of the construction of which are illustrated in the accompanying drawings in which:

FIGURE 4 is a cross section taken along lines 4—4 of the diaphragm of FIGURE 3.

FIGURE 5 is an elevational view of the second embodiment of the diaphragm of FIGURE 1.

FIGURE 6 is a cross section taken along lines 6—6 of the diaphragm of FIGURE 5.

FIGURE 7 is a cross section of a third embodiment of the diaphragm of FIGURE 1; and FIGURE 8 is a partially sectioned view of a second embodiment of the vacuum actuator of the present invention.

Figure 1:
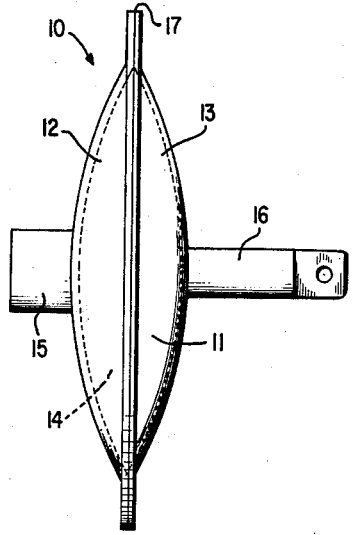
FIGURE 1 is a view in side elevation of the vacuum actuator of the present invention.

Referring now to the drawings, the vacuum actuator of the present invention illustrated generally at 10 in FIGURE 1 includes a central body or casing 11 formed from mating convex casing sections 12 and 13. Casing section 12 is formed to remain rigid and nonresponsive to pressure differentials produced in a vacuum chamber 14 (illustrated by broken lines in FIGURE 1) which is defined by the mating casing sections 12 and 13. A hose attachment 15 is secured to the rigid casing section 12 so that a vacuum source (not shown) may be connected to the actuator 10 to evacuate the chamber 14.

Figure 2:
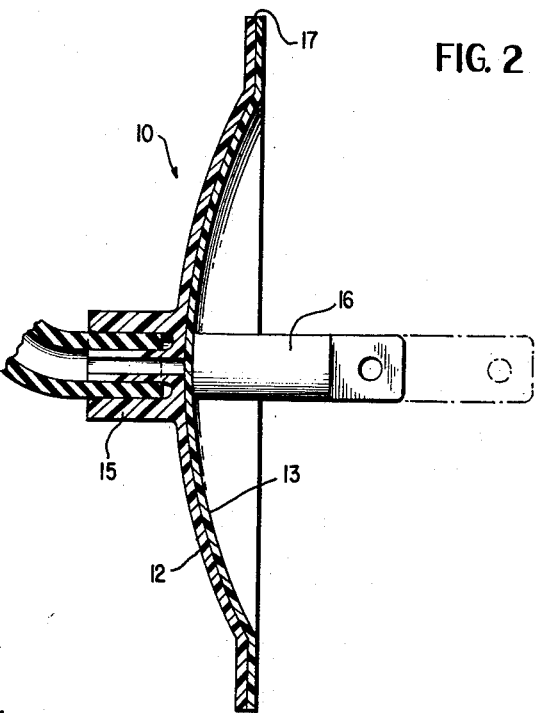
FIGURE 2 is a partially sectioned view illustrating the position assumed by the actuator of FIGURE 1 when vacuum is applied.

Casing section 13 composes a pressure responsive, flexible diaphragm which is caused to flex inwardly when vacuum chamber 14 is evacuated, as illustrated by FIGURE 2. Under the influence of a vacuum produced in the vacuum chamber 14, the flexible diaphragm 13 flexes and moves into the vacuum chamber until the diaphragm has assumed a concave configuration against the inner wall of the casing section 12. This inward flexing of the diaphragm 13 causes an actuator member 16, which is carried by the diaphragm, to move inwardly from the dotted line position of FIGURE 2. When the vacuum source is removed from the actuator 10 and the chamber 14 is returned to substantially atmospheric pressure, the diaphragm 13 flexes back to the normal position of FIGURE 1 and returns the actuator member 16 to the dotted line position of FIGURE 2.

Casing sections 12 and 13 are preferably disc shaped in configuration and are peripherally sealed at 17. It has been found to be advantageous to construct both casing sections of plastic material such as polyethylene, as casing sections so constructed may then be heat sealed at 17. Also, casing sections constructed from plastic materials are inexpensive to produce and are not subject to deterioration from rust and corrosion.

Figure 3:
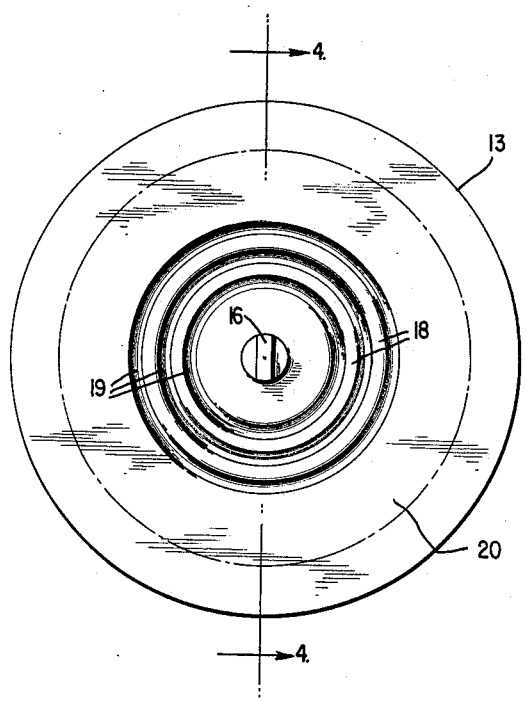
FIGURE 3 is an elevational view illustrating an embodiment of the diaphragm of FIGURE 1.

Referring now to FIGURES 3 through 7, various embodiments of the flexible casing structure of diaphragm 13 may be noted. The flexible diaphragm 13 must be constructed so that under normal atmospheric conditions, the convex configuration of FIGURE 1 will be assumed. The diaphragm 13 must be capable of snapping from the normal convex configuration of FIGURE 1 under the influence of a differential pressure in the chamber 14 to the concave configuration of FIGURE 2, and then snapping back to the normal position of FIGURE 1 upon the withdrawal of the differential pressure from the vacuum chamber 14. FIGURES 3 and 4 illustrate a diaphragm construction having sufficient rigidity to permit the diaphragm 13 to assume and maintain a normally convex configuration, but which will also permit the diaphragm 13 to flex to a concave configuration in response to a differential pressure condition. With reference to FIGURES 3 and 4, it may be noted that the diaphragm 13 is provided with circular corrugations 18 which are formed in the surface of the diaphragm 13 adjacent the center portion thereof. These corrugations may be circular in nature and extend completely around the center of the diaphragm 13, as illustrated by FIGURE 3, or the corrugations may constitute merely segments of a circle. Corrugations 18 are formed by indenting the surface of the diaphragm 13, as illustrated at 19 in FIGURE 4, and thereby weakening the diaphragm so that it is permitted to flex inwardly to a concave position under the influence of a pressure differential in the chamber 14 of FIGURE 1. It is obvious that corrugations 18 could be formed on both surfaces of the diaphragm 13, but it is important that these corrugations be formed adjacent the center portion of the diaphragm 13 and preferably within a section defined by one half the radius of the diaphragm taken from the center point thereof. With the corrugations so formed, the outer portion of the diaphragm 13, indicated at 20, is left intact to impart a rigidity sufficient to maintain the diaphragm in a normal convex configuration and to return the diaphragm to this configuration upon the removal of a vacuum source from the actuator 10. This diaphragm construction is of extreme value, as the tendency of the diaphragm 13 to reassume a convex configuration upon the removal of the vaccum from chamber 14, eliminates the necesstity of employing additional biasing means to reposition the diaphragm. Also, the semi-rigid properties of the diaphragm 13 render its use as a casing section feasible, thereby making it unnecessary to provide a separate casing section to protect the diaphragm.

The embodiments of the diaphragm 13 illustrated by FIGURES 5, 6 and 7 dispense with the corrugations 18, but flexibility is still achieved in these embodiments by forming the central portions of the diaphragm 13 so that they will exhibit less rigidity than the outer portions thereof. This is achieved in the embodiment shown by FIGURES 5 and 6 by tapering the surface of the diaphragm 13 inwardly toward the center portion thereof as indicated at 21 so that the central portion of the diaphragm is of less thickness than the outer portion 20. In the embodiment of FIGURE 6, the taper is begun at a spaced point from the center of the diaphragm which is within a circular section having a radius equal to one half the radius of the diaphragm measured from the center point thereof. In the embodiment of FIGURE 7, the surface of the diaphragm is tapered from the outer periphery to the center point thereof to achieve flexibility. It is obvious that the tapered surface illustrated by the embodiments of FIGURES 5, 6 and 7 might be placed on either or both sides of the diaphragm to achieve the desired flexibility of the diaphragm under differential pressure conditions.

FIGURE 8 illustrates a double acting vacuum actuator indicated generally at 22, which incorporates a mode of operation substantially similar to that of the vacuum actuator 10 of FIGURE 1, and for clarity of description, the reference numerals of FIGURE 1 will be utilized to designate similar components in FIGURE 8. Referring now to FIGURE 8, the double acting vacuum actuator 22 includes a central body or casing 11a having a forward actuator unit 23 and a rear actuator unit 24. Forward actuator unit 23 is substantially identical to the vacuum actuator 10 of FIGURE 1, and includes rigid casing section 12, flexible casing section 13, actuator member 16, and vacuum connection 15. Vacuum connection 15 is mounted upon rigid casing section 12 and extends between actuator unit 23 and actuator unit 24 to communicate with the vacuum chamber 14 defined by the mating casing sections 12 and 13.

Rear actuator unit 24 of the double acting vacuum actuator 22 is formed by components which are similar to those of forward actuator unit 23, and includes a substantially convex casing section 25 which mates with a convex flexible casing section or diaphragm 26. Casing sections 25 and 26 define a vacuum chamber 27 which may be evacuated through a hose connection 28 secured to the rigid casing section 24. The flexible casing section or diaphragm 26 is attached to the rigid casing section 12 of the forward actuator unit 23, and the forward actuator unit 23 moves with the diaphragm 26. Diaphragms 26 and 13 may be constructed in accordance with the embodiments illustrated by FIGURES 3 through 7.

In the operation of the double acting vacuum actuator of FIGURE 8, a source of vacuum may be connected to hose connection 15 to evacuate the vacuum chamber 14. Evacuation of chamber 14 causes diaphragm 13 to flex inwardly against the inner surface of rigid casing section 12, thereby moving actuator 16 inwardly from the solid line position of FIGURE 8. If it should become desirable to move the actuating member 16 to a second rearward position, a source of vacuum may be attached to hose connection 28 to evacuate vacuum chamber 27, thereby causing diaphragm 26 to flex to a concave position against the inner surface of rigid casing section 24. This movement of the diaphragm 26 will also cause forward actuator unit 23 to be moved rearwardly, thereby repositioning actuator member 16. Upon the removal of the vacuum source from the hose connections 15 and 28, the diaphragms 13 and 26 will again assume the normal convex configuration illustrated by FIGURE 8. Thus it may be seen that vacuum chambers 14 and 27 of the double acting vacuum actuator 22 of FIGURE 8 may be selectively evacuated to cause the actuating member 16 to move to various predetermined positions.

In use the embodiments of FIGURES 1 through 7 may be suitably mounted at the hose connection 15 or from the casing section 12, while the embodiment of FIG. 8 may be mounted at the connection 28 or from the casing section 24.

It will be readily apparent to those skilled in the art that the present invention provides a novel and improved vacuum actuator of simple construction which may be effectively utilized as a motive means for a wide variety of applications. The arrangements and types of components described herein may be subject to numerous modifications well within the purview of this inventor who intends only to be limited to a liberal interpretation of the specification and appended claims.

I claim:

1. A differential fluid pressure actuator comprising:
   (a) a first means having a pressure chamber defined by a pair of concave disc shape members peripherally secured together in a sealed relationship with the concave sides thereof facing each other, one of said members being rigid and the other member being flexible,
   (b) inlet means connected to the rigid member of said first means and having a passage open to said chamber,
   (c) a second means having a pressure chamber defined by a pair of concave disc shape members peripherally secured together in a sealed relationship with the concave sides thereof facing each other, one of said members being rigid and the other member being flexible, the center section of the rigid member of the second means being secured to the center section of the flexible member of the first means,
   (d) inlet means connected to the rigid member of said second means and having a passage open to the chamber in the second means, and
   (e) control means connected to the center section of said flexible member of said second means.

2. The actuator defined in claim 1 wherein:
   (a) the center section of at least one flexible member is reduced in thickness relative to the peripheral section.

3. The actuator defined in claim 1 wherein:
   (a) the center section of at least one flexible member has concentric corrugations to reduce the thickness thereof.

4. A differential fluid pressure actuator comprising:
(a) a body having a plurality of sequentially spaced pressure chambers,
(b) each pressure chamber defined by a pair of concave disc shape members peripherally secured together in a sealed relationship with the concave sides thereof facing each other, one of said members being rigid and the other member flexible, the center sections of the rigid member and flexible member of adjacent chambers being secured together,
(c) separate inlet means connected to each rigid member and having a passage open to the associated chamber, and
(d) control means connected to the center section of the flexible member of the last pressure chamber.

References Cited by the Examiner

UNITED STATES PATENTS

| | | | |
|---|---|---|---|
| 691,692 | 1/02 | Zweigbergk | 91—167 |
| 1,750,634 | 3/30 | Forsberg. | |
| 2,369,463 | 2/45 | Abbott | 137—85 |
| 2,389,366 | 11/45 | Jones | 137—793 |
| 2,452,176 | 10/48 | Bent | 121—48 |
| 2,568,228 | 9/51 | Forse | 303—6 |

FOREIGN PATENTS

| | | |
|---|---|---|
| 338,464 | 11/30 | Great Britain. |
| 684,106 | 3/30 | France. |
| 1,012,523 | 4/52 | France. |

FRED E. ENGELTHALER, *Primary Examiner.*
EMILE PAUL, *Examiner.*